United States Patent
Lin et al.

(10) Patent No.: US 11,741,968 B2
(45) Date of Patent: Aug. 29, 2023

(54) PERSONALIZED VOICE CONVERSION SYSTEM

(71) Applicant: National Chung Cheng University, Chia-Yi (TW)

(72) Inventors: Tay Jyi Lin, Chiayi County (TW); Yu Chia Hu, Chia-Yi (TW); Yi-Hsuan Ting, Taichung (TW); Ching Wei Yeh, Chia-Yi (TW); Jinn-Shyan Wang, Chia-Yi (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 219 days.

(21) Appl. No.: 17/475,903

(22) Filed: Sep. 15, 2021

(65) Prior Publication Data
US 2023/0026329 A1    Jan. 26, 2023

(30) Foreign Application Priority Data

Jul. 21, 2021    (TW) .................................. 110126851

(51) Int. Cl.
*G10L 15/30* (2013.01)
*G10L 15/22* (2006.01)

(52) U.S. Cl.
CPC .............. *G10L 15/30* (2013.01); *G10L 15/22* (2013.01)

(58) Field of Classification Search
USPC .................................................... 704/1–504
See application file for complete search history.

(56) References Cited

U.S. PATENT DOCUMENTS

| | | | |
|---|---|---|---|
| 10,529,353 B2 * | 1/2020 | Maziewski | G10L 21/0208 |
| 10,809,964 B2 * | 10/2020 | Deng | H04L 65/60 |
| 11,023,005 B2 * | 6/2021 | Deng | G06F 1/163 |
| D983,744 S * | 4/2023 | Yi | D3/294 |
| 11,671,744 B2 * | 6/2023 | Yang | A44C 5/003 381/370 |
| 2017/0332128 A1 * | 11/2017 | Jeong | H04M 1/72415 |
| 2019/0043514 A1 * | 2/2019 | Maziewski | G10L 15/34 |
| 2020/0110439 A1 * | 4/2020 | Deng | G06F 3/017 |
| 2020/0110569 A1 * | 4/2020 | Deng | H04R 5/033 |
| 2021/0209388 A1 * | 7/2021 | Ciftci | G06V 40/40 |
| 2023/0026329 A1 * | 1/2023 | Lin | G10L 15/22 |

\* cited by examiner

*Primary Examiner* — Marcus T Riley
(74) *Attorney, Agent, or Firm* — Muncy, Geissler, Olds & Lowe, P.C.

(57) ABSTRACT

A personalized voice conversion system includes a cloud server and an intelligent device that communicates with the cloud server. The intelligent device upstreams an original voice signal to the cloud server. The cloud server converts the original voice signal into an intelligible voice signal based on an intelligible voice conversion model. The intelligent device downloads and plays the intelligible voice signal. Based on the original voice signal and the corresponding intelligible voice signal, the cloud server and the intelligent device train an off-line voice conversion model provided to the intelligent device. When the intelligent device stops communicating with the cloud server, the intelligent device converts a new original voice signal into a new intelligible voice signal based on the off-line voice conversion model and plays the new intelligible voice signal.

16 Claims, 9 Drawing Sheets

PERSONALIZED VOICE CONVERSION SYSTEM

This application claims priority of Application No. 110126851 filed in Taiwan on 21 Jul. 2021 under 35 U.S.C. § 119; the entire contents of all of which are hereby incorporated by reference.

BACKGROUND OF THE INVENTION

Field of the Invention

The present invention relates to a conversion system, particularly to a personalized voice conversion system.

Description of the Related Art

Voice conversion represents that voices are processed by signal processing and artificial intelligence. When voices are converted, the pitch, sound speed, and timbre of voices will change like the voice changing technology of a voice changer. This kind of technology can also be used to help dysarthria patients, such as converting voices made by stroke patients into intelligible speech. Because the patients suffer from different causes of dysarthria and make different voices, the voice conversion device is usually trained based on the voices of a specific user. This kind of voice conversion device is called a personalized voice conversion device.

The personalized voice conversion device performs voice conversion using a cloud server with powerful computing capabilities. FIG. 1 is a schematic diagram illustrating an on-line personalized voice conversion system in the conventional technology. Referring to FIG. 1, a personalized voice conversion system 1 includes an intelligent device 10 and a cloud server 11. The intelligent device 10 communicates with the cloud server 11. The intelligent device 10 records and processes original voices VI and then upstreams the original voices VI to the cloud server 11. The cloud server 11 converts the original voices VI into intelligible voices VO using artificial intelligence. Then, the cloud server 11 downstreams the intelligible voices VO to the intelligent device 10. Finally, the intelligent device 10 plays the intelligible voices VO. However, when the intelligent device 10 is located in an off-line environment such as a basement or an elevator car, the intelligent device 10 cannot successfully convert the original voices VI. As a result, if the original voices VI are converted in an off-line environment, the intelligent device 10 must have an additional storage space. In an on-line state, the intelligent device 10 files the original voices VI and the corresponding intelligible voices VO and stores them in the storage space. FIG. 2 is a schematic diagram illustrating an off-line personalized voice conversion system in the conventional technology. Referring to FIG. 2, if the intelligent device 10 receives original voices VI' in an off-line state, the intelligent device 10 will search the original voices VI closest to the original voices VI' and the corresponding the intelligible voices VO from the storage space in a cache-like method and play the searched intelligible voices VO. However, the personalized voice conversion system 1 has some drawbacks. For example, the best voice conversion effect in an off-line state requires a huge amount of storage space. Besides, searching the corresponding voices requires additional computation. The greater the amount of stored voice data, the greater the amount of computation. Also, it is not easy to find the same voice for conversion.

To overcome the abovementioned problems, the present invention provides a personalized voice conversion system, so as to solve the afore-mentioned problems of the prior art.

SUMMARY OF THE INVENTION

The present invention provides a personalized voice conversion system, which improves the voice conversion effect without adding additional storage space and computation.

In an embodiment of the present invention, a personalized voice conversion system includes at least one cloud server and an intelligent device communicating with the cloud server. The intelligent device is configured to receive at least one first original voice signal and upstream the first original voice signal to the cloud server. The cloud server is configured to store the first original voice signal and convert the first original voice signal into at least one first intelligible voice signal based on an intelligible voice conversion model. The intelligent device is configured to download and play the first intelligible voice signal. The cloud server is configured to train at least one off-line voice conversion model based on the first original voice signal and the corresponding first intelligible voice signal. The intelligent device is configured to download the off-line voice conversion model. When the intelligent device stops communicating with the cloud server, the intelligent device receives a second original voice signal, converts the second original voice signal into a second intelligible voice signal based on the off-line voice conversion model, and plays the second intelligible voice signal.

In an embodiment of the present invention, the cloud server includes a first cloud server and a second cloud server. The first cloud server is electrically connected to the second cloud server. When the first cloud server and the second cloud server communicate with the intelligent device, the intelligent device upstreams the first original voice signal to the first cloud server and stores the first original voice signal into the first cloud server. The first cloud server converts the first original voice signal into the first intelligible voice signal based on the intelligible voice conversion model and transmits the first original voice signal and the first intelligible voice signal to the second cloud server. The second cloud server trains the off-line voice conversion model based on the first original voice signal and the corresponding first intelligible voice signal. When the intelligent device stops communicating with the first cloud server and the second cloud server, the intelligent device receives the second original voice signal.

In an embodiment of the present invention, the at least one first original voice signal includes a plurality of first original voice signals, the at least one first intelligible voice signal includes a plurality of first intelligible voice signals, and the at least one off-line voice conversion model includes a plurality of off-line voice conversion models. The intelligent device is configured to sequentially download the plurality of off-line voice conversion models and use a latest off-line voice conversion model of the plurality of off-line voice conversion models to update the remains of the plurality of off-line voice conversion models. When the intelligent device stops communicating with the cloud server, the intelligent device converts the second original voice signal into the second intelligible voice signal based on the latest off-line voice conversion model of the plurality of off-line voice conversion models.

In an embodiment of the present invention, the cloud server includes a data transmission interface, a database, a voice clarifying device, and a voice training device. The data transmission interface communicates with the intelligent device. The intelligent device is configured to download the first intelligible voice signal and the off-line voice conversion model through the data transmission interface. The database is electrically connected to the data transmission interface and configured to receive and store the first original voice signal through the data transmission interface. The voice clarifying device is electrically connected to the data transmission interface and configured to receive the first original voice signal through the data transmission interface and convert the first original voice signal into the first intelligible voice signal based on the intelligible voice conversion model. The voice training device is electrically connected to the database, the data transmission interface, and the voice clarifying device. The voice training device is configured to receive the first original voice signal and the corresponding first intelligible voice signal and train the off-line voice conversion model based on the first original voice signal and the corresponding first intelligible voice signal.

In an embodiment of the present invention, the voice clarifying device includes a first normalizer, a framing circuit, a short time Fourier transformer, a second normalizer, a voice converter, a denormalizer, an inverse fast Fourier transformer, and an interpolation circuit. The first normalizer is electrically connected to the data transmission interface. The first normalizer is configured to receive and normalize the first original voice signal to generate a normalized voice signal. The framing circuit is electrically connected to the first normalizer and configured to receive and divide the normalized voice signal into overlapping frames. The short time Fourier transformer is electrically connected to the framing circuit and configured to retrieve frequency-domain information from each of the frames, wherein the frequency-domain information includes voice magnitude and voice phases. The second normalizer is electrically connected to the short time Fourier transformer and configured to receive and normalize the voice magnitude to generate normalized voice magnitude. The voice converter is electrically connected to the second normalizer and configured to receive the normalized voice magnitude. The voice converter is configured to convert the normalized voice magnitude into intelligible voice magnitude based on the intelligible voice conversion model. The denormalizer is electrically connected to the voice converter and configured to denormalize the intelligible voice magnitude to generate denormalized intelligible voice magnitude. The inverse fast Fourier transformer is electrically connected to the short time Fourier transformer and the denormalizer. The inverse fast Fourier transformer is configured to receive and synthesize the voice phases and the denormalized intelligible voice magnitude to generate a synthesized voice signal in time domain. The interpolation circuit is electrically connected to the voice training device, the inverse fast Fourier transformer, and the data transmission interface and configured to receive the synthesized voice signal and perform interpolation on the synthesized voice signal to generate the first intelligible voice signal.

In an embodiment of the present invention, the voice training device includes a pre-processing circuit, a short time Fourier transformer, a normalizer, and a voice model trainer. The pre-processing circuit is electrically connected to the database and the voice clarifying device. The pre-processing circuit is configured to receive the first original voice signal and the corresponding first intelligible voice signal, use dynamic time warping (DTW) to align the first original voice signal to the corresponding first intelligible voice signal, and frame the first original voice signal and the corresponding first intelligible voice signal to generate original frames and intelligible frames. The short time Fourier transformer is electrically connected to the pre-processing circuit and configured to receive the original frames and the intelligible frames. The short time Fourier transformer is configured to respectively retrieve original voice features and intelligible voice features from the original frames and the intelligible frames. The normalizer is electrically connected to the short time Fourier transformer and configured to receive and normalize the original voice features and the intelligible voice features to respectively generate normalized original voice features and normalized intelligible voice features. The voice model trainer is electrically connected to the normalizer and the data transmission interface and configured to receive the normalized original voice features and the normalized intelligible voice features and train the off-line voice conversion model based on the normalized original voice features and the normalized intelligible voice features.

In an embodiment of the present invention, the intelligent device is an intelligent phone or a tablet computer.

In an embodiment of the present invention, the intelligible voice conversion model and the off-line voice conversion model are implemented with deep neural networks (DNNs) or generative adversarial networks (GANs).

In an embodiment of the present invention, a personalized voice conversion system includes at least one cloud server and an intelligent device communicating the cloud server. The intelligent device is configured to receive and store at least one first original signal and upstream the first original signal to the cloud server. The cloud server is configured to convert the first original signal into at least one first intelligible voice signal based on an intelligible voice conversion model. The intelligent device is configured to download and play the first intelligible voice signal. The intelligent device is configured to train at least one off-line voice conversion model based on the first original signal and the corresponding first intelligible voice signal. When the intelligent device stops communicating with the cloud server, the intelligent device receives a second original voice signal, converts the second original voice signal into a second intelligible voice signal based on the off-line voice conversion model, and plays the second intelligible voice signal.

In an embodiment of the present invention, the at least one first original voice signal includes a plurality of first original voice signals, the at least one first intelligible voice signal includes a plurality of first intelligible voice signals, and the at least one off-line voice conversion model includes a plurality of off-line voice conversion models. The intelligent device is configured to sequentially train the plurality of off-line voice conversion models and use the latest off-line voice conversion model of the plurality of off-line voice conversion models to update the remains of the plurality of off-line voice conversion models. When the intelligent device stops communicating with the cloud server, the intelligent device converts the second original voice signal into the second intelligible voice signal based on the latest off-line voice conversion model of the plurality of off-line voice conversion models.

In an embodiment of the present invention, the cloud server includes a first data transmission interface communicating with the intelligent device and a voice clarifying device. The voice clarifying device is electrically connected to the first data transmission interface and configured to receive the first original voice signal through the first data transmission interface and convert the first original voice signal into the first intelligible voice signal based on the intelligible voice conversion model.

In an embodiment of the present invention, the voice clarifying device includes a first normalizer, a framing circuit, a short time Fourier transformer, a second normalizer, a voice converter, a denormalizer, an inverse fast Fourier transformer, and an interpolation circuit. The first normalizer is electrically connected to the first data transmission interface. The first normalizer is configured to receive and normalize the first original voice signal to generate a normalized voice signal. The framing circuit is electrically connected to the first normalizer and configured to receive and divide the normalized voice signal into overlapping frames. The short time Fourier transformer is electrically connected to the framing circuit and configured to retrieve frequency-domain information from each of the frames. The frequency-domain information includes voice magnitude and voice phases. The second normalizer is electrically connected to the short time Fourier transformer and configured to receive and normalize the voice magnitude to generate normalized voice magnitude. The voice converter is electrically connected to the second normalizer and configured to receive the normalized voice magnitude. The voice converter is configured to convert the normalized voice magnitude into intelligible voice magnitude based on the intelligible voice conversion model. The denormalizer is electrically connected to the voice converter and configured to denormalize the intelligible voice magnitude to generate denormalized intelligible voice magnitude. The inverse fast Fourier transformer is electrically connected to the short time Fourier transformer and the denormalizer. The inverse fast Fourier transformer is configured to receive and synthesize the voice phases and the denormalized intelligible voice magnitude to generate a synthesized voice signal in time domain. The interpolation circuit is electrically connected to the inverse fast Fourier transformer and the first data transmission interface and configured to receive the synthesized voice signal and perform interpolation on the synthesized voice signal to generate the first intelligible voice signal.

In an embodiment of the present invention, the intelligent device includes a storage, a voice transceiver interface, a second data transmission interface, a processor, a voice training device, and a voice clarifying device. The voice transceiver interface is configured to receive the first original voice signal. The second data transmission interface communicates with the first data transmission interface. The processor is electrically connected to the storage, the voice transceiver interface, and the second data transmission interface and configured to receive the first original voice signal through the voice transceiver interface. The processor is configured to output the first original voice signal through the second data transmission interface and store the first original voice signal in the storage. The voice training device is electrically connected to the storage and the interpolation circuit. The voice training device is configured to receive the first original voice signal and the corresponding the first intelligible voice signal and train the off-line voice conversion model based on the first original voice signal and the corresponding first intelligible voice signal. The voice clarifying device is electrically connected to the voice transceiver interface and the voice training device and configured to receive the second original voice signal through the voice transceiver interface. The voice clarifying device is configured to convert the second original voice signal into the second intelligible voice signal based on the off-line voice conversion model. The voice clarifying device and the voice transceiver interface are configured to play the second intelligible voice signal.

In an embodiment of the present invention, the voice training device includes a pre-processing circuit, a short time Fourier transformer, a normalizer, and a voice model trainer. The pre-processing circuit is electrically connected to the storage and the interpolation circuit. The pre-processing circuit is configured to receive the first original voice signal and the corresponding first intelligible voice signal, use dynamic time warping (DTW) to align the first original voice signal to the corresponding first intelligible voice signal, and frame the first original voice signal and the corresponding first intelligible voice signal to generate original frames and intelligible frames. The short time Fourier transformer is electrically connected to the pre-processing circuit and configured to receive the original frames and the intelligible frames. The short time Fourier transformer is configured to respectively retrieve original voice features and intelligible voice features from the original frames and the intelligible frames. The normalizer is electrically connected to the short time Fourier transformer and configured to receive and normalize the original voice features and the intelligible voice features to respectively generate normalized original voice features and normalized intelligible voice features. The voice model trainer is electrically connected to the normalizer and the voice clarifying device and configured to receive the normalized original voice features and the normalized intelligible voice features and train the off-line voice conversion model based on the normalized original voice features and the normalized intelligible voice features.

In an embodiment of the present invention, the intelligent device is an intelligent phone or a tablet computer.

In an embodiment of the present invention, the intelligible voice conversion model and the at least one off-line voice conversion model are implemented with a deep neural networks (DNNs) or generative adversarial networks (GANs).

To sum up, the personalized voice conversion system obtains the corresponding data results based on the computational cache technology and the off-line voice conversion model. When the times of using the computational cache technology are more, the voice conversion effect is better without adding additional storage space and computation.

Below, the embodiments are described in detail in cooperation with the drawings to make easily understood the technical contents, characteristics and accomplishments of the present invention.

DETAILED DESCRIPTION OF THE INVENTION

Figure 1:
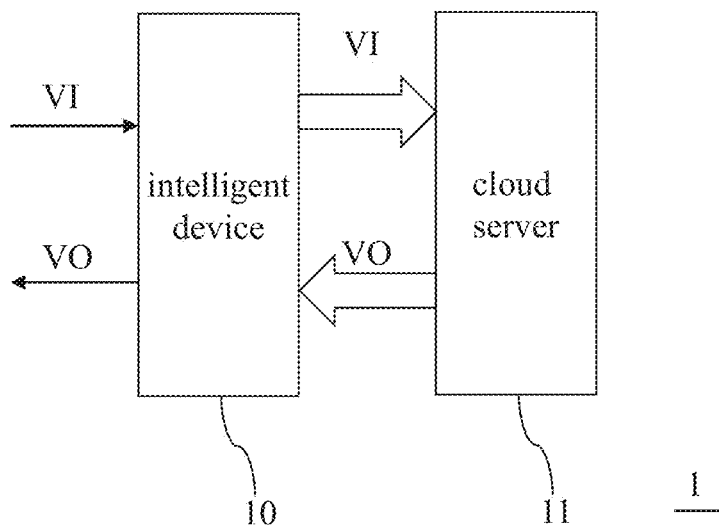
FIG. 1 is a schematic diagram illustrating an on-line personalized voice conversion system in the conventional technology.
Figure 2:
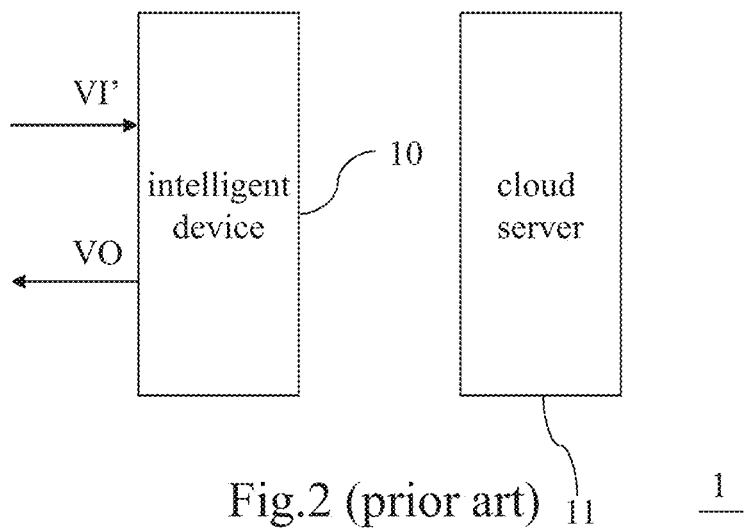
FIG. 2 is a schematic diagram illustrating an off-line personalized voice conversion system in the conventional technology.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

Besides, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Unless otherwise specified, some conditional sentences or words, such as "can", "could", "might", or "may", usually attempt to express that the embodiment in the present invention has, but it can also be interpreted as a feature, element, or step that may not be needed. In other embodiments, these features, elements, or steps may not be required.

Figure 3:
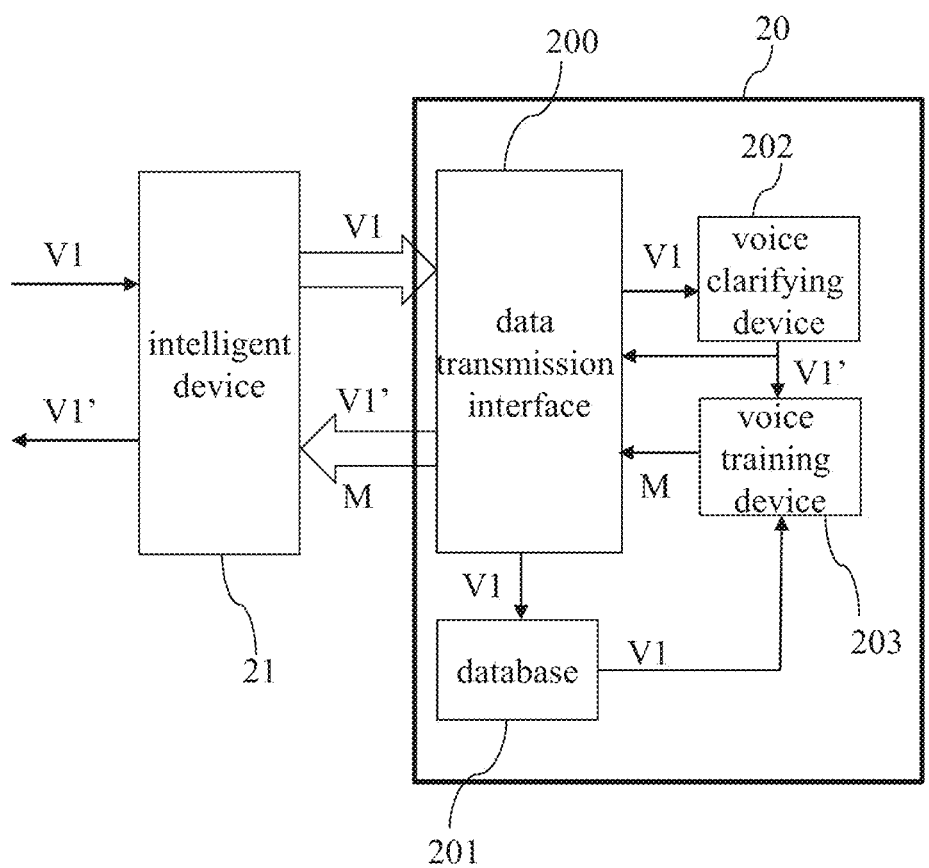
FIG. 3 is a schematic diagram illustrating an on-line personalized voice conversion system according to a first embodiment of the present invention.

FIG. 3 is a schematic diagram illustrating an on-line personalized voice conversion system according to a first embodiment of the present invention. Referring to FIG. 3, the first embodiment of the personalized voice conversion system of the present invention is introduced as follows. The personalized voice conversion system 2 includes at least one cloud server 20 and an intelligent device 21. The intelligent device 21 communicates with the cloud server 20. For clarity and convenience, the first embodiment exemplifies one cloud server 20. The intelligent device 21 may be an intelligent phone or a tablet computer, but the present invention is not limited thereto.

When the cloud server 20 communicates with the intelligent device 21, the intelligent device 21 receives at least one first original voice signal V1 and upstreams the first original voice signal V1 to the cloud server 20. The cloud server 20 stores the first original voice signal V1 and converts the first original voice signal V1 into at least one first intelligible voice signal V1' based on a trained-well artificial intelligence model, such as an intelligible voice conversion model. The intelligent device 21 downloads and plays the first intelligible voice signal V1'. The cloud server 20 trains at least one off-line voice conversion model M based on the first original voice signal V1 and the corresponding first intelligible voice signal V1'. The intelligent device 21 downloads the off-line voice conversion model M. The intelligible voice conversion model and the off-line voice conversion model M may be implemented with deep neural networks (DNNs) or generative adversarial networks (GANs), but the present invention is not limited thereto.

Figure 4:
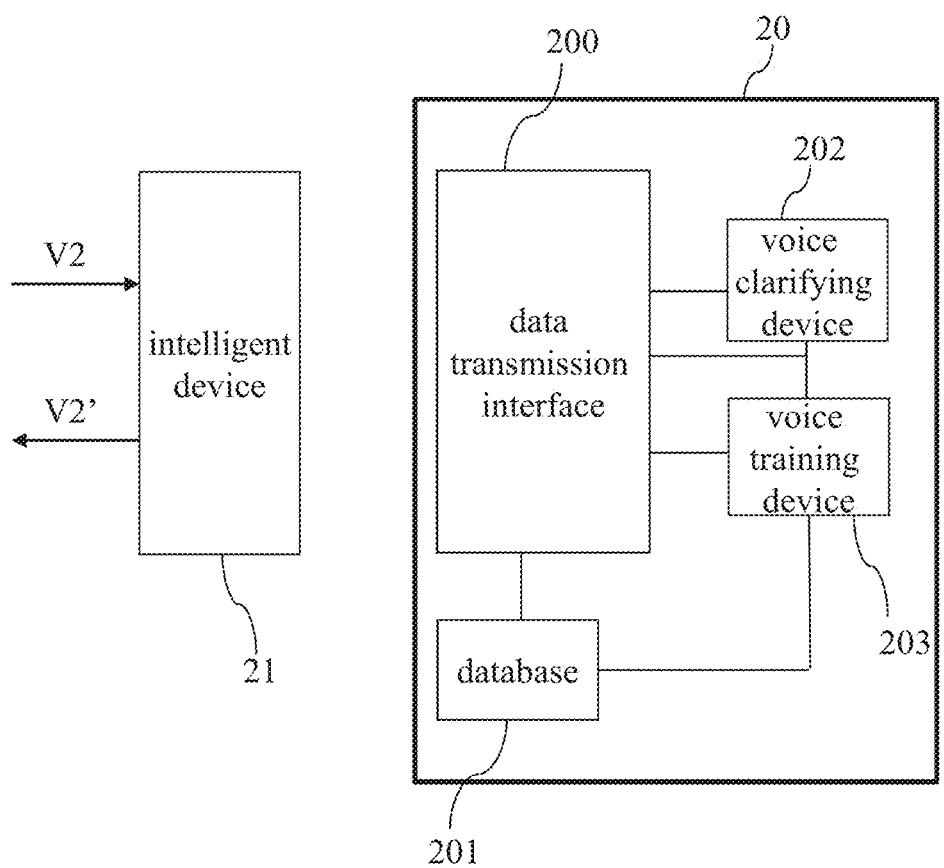
FIG. 4 is a schematic diagram illustrating an off-line personalized voice conversion system according to the first embodiment of the present invention.

FIG. 4 is a schematic diagram illustrating an off-line personalized voice conversion system according to the first embodiment of the present invention. Referring to FIG. 4, the intelligent device 21 includes a voice clarifying device. When the intelligent device 21 stops communicating with the cloud server 20, the voice clarifying device of the intelligent device 21 receives a second original voice signal V2, converts the second original voice signal V2 into a second intelligible voice signal V2' based on the computational cache technology and the off-line voice conversion model M, and plays the second intelligible voice signal V2'.

As illustrated in FIG. 3 and FIG. 4, there are a plurality of first original voice signals V1, a plurality of first intelligible voice signals V1', and a plurality of off-line voice conversion models M in some embodiments of the present invention. The intelligent device 21 sequentially downloads the plurality of off-line voice conversion models M and regularly or irregularly use the latest off-line voice conversion model M of the plurality of off-line voice conversion models M to update the remains of the plurality of off-line voice conversion models M. When the intelligent device 21 stops communicating with the cloud server 20, the intelligent device 21 converts the second original voice signal V2 into the second intelligible voice signal V2' based on the latest off-line voice conversion model M of the plurality of off-line voice conversion models M. Thus, when the times of using the computational cache technology are more, the voice conversion effect, such as the conversion effect of timbre and pitch, is better without adding additional storage space and computation.

As illustrated in FIG. 3 and FIG. 4, the cloud server 20 may include a data transmission interface 200, a database 201, a voice clarifying device 202, and a voice training device 203 in some embodiments of the present invention. The data transmission interface 200 communicates with the intelligent device 21. The database 201 is electrically connected to the data transmission interface 200. The voice clarifying device 202 is electrically connected to the data transmission interface 200. The voice training device 203 is electrically connected to the database 201, the data transmission interface 200, and the voice clarifying device 202. When the data transmission interface 200 communicates with the intelligent device 21, the database 201 receives and stores the first original voice signal V1 through the data transmission interface 200. The voice clarifying device 202 receives the first original voice signal V1 through the data transmission interface 200 and convert the first original voice signal V1 into the first intelligible voice signal V1' based on the intelligible voice conversion model. The intelligent device 21 downloads the first intelligible voice signal V1' through the data transmission interface 200. The voice training device 203 respectively receives the first original voice signal V1 and the corresponding first intelligible voice signal V1' from the database 201 and the voice clarifying device 202. The voice training device 203 trains the off-line voice conversion model M based on the first original voice signal V1 and the corresponding first intelligible voice signal V1'. The intelligent device 21 downloads the off-line voice conversion model M through the data transmission interface 200. The voice clarifying device 202 may be the same as the voice clarifying device of the intelligent device 21, but the present invention is not limited to the implementation of the voice clarifying device.

Figure 5:
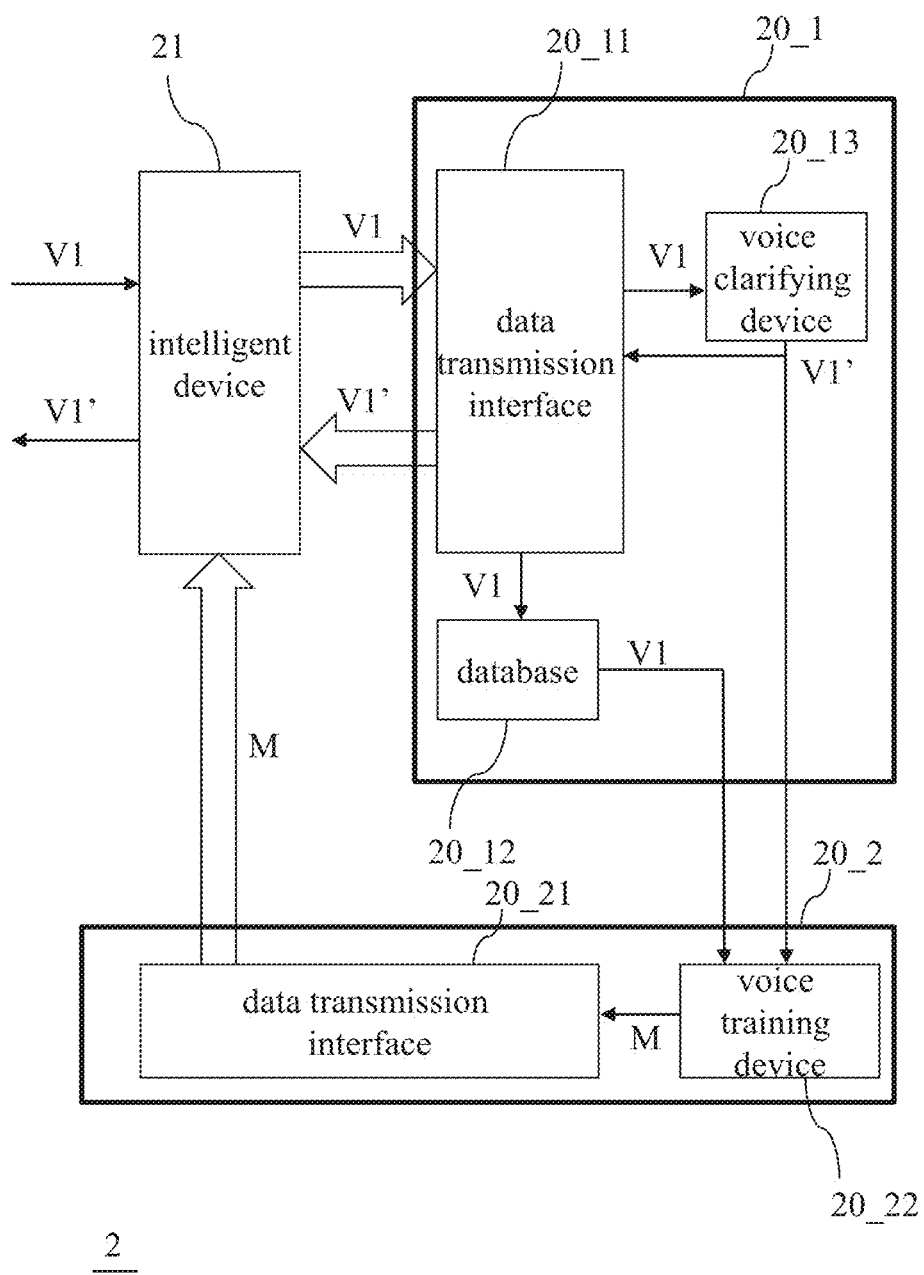
FIG. 5 is a schematic diagram illustrating an on-line personalized voice conversion system according to a second embodiment of the present invention.

FIG. 5 is a schematic diagram illustrating an on-line personalized voice conversion system according to a second embodiment of the present invention. Referring to FIG. 5, the second embodiment of the personalized voice conversion system of the present invention is introduced as follows. The second embodiment is different from the first embodiment in the number and the internal components of the cloud server 20. In the second embodiment, a first cloud server 20_1 and a second cloud server 20_2 are respectively configured to store data and train model. The first cloud server 20_1 is electrically connected to the second cloud server 20_2. When the first cloud server 20_1 and the second cloud server 20_2 communicate with the intelligent device 21, the intelligent device 21 upstreams the first original voice signal V1 to the first cloud server 20_1 and stores the first original voice signal V1 into the first cloud server 20_1. The first cloud server 20_1 converts the first original voice signal V1 into the first intelligible voice signal V1' based on the intelligible voice conversion model and transmits the first original voice signal V1 and the first intelligible voice signal V1' to the second cloud server 20_2. The second cloud server 20_2 trains the off-line voice conversion model M based on the first original voice signal V1 and the corresponding first intelligible voice signal V1'. The intelligent device 21 downloads the off-line voice conversion model M.

Figure 6:
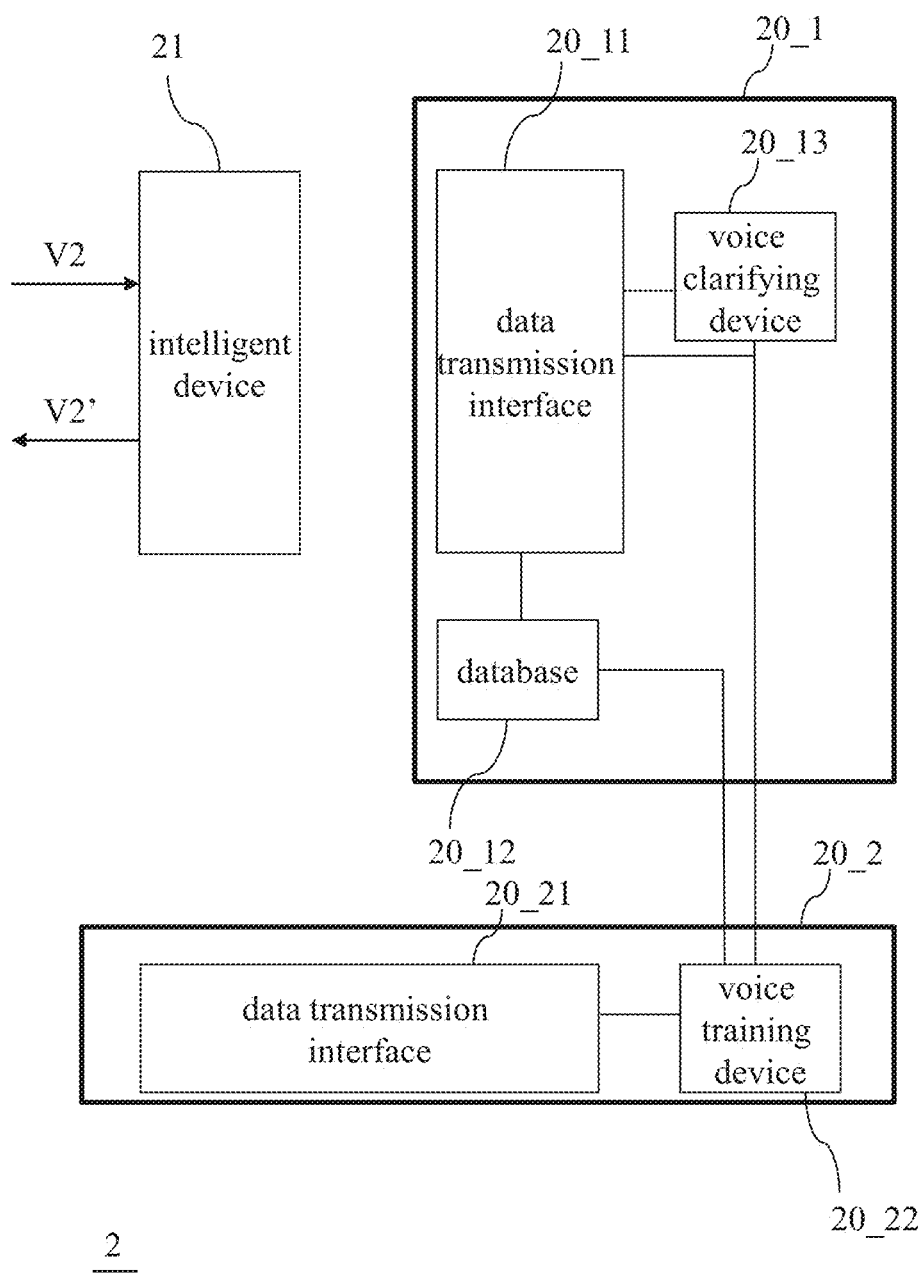
FIG. 6 is a schematic diagram illustrating an off-line personalized voice conversion system according to the second embodiment of the present invention.

FIG. 6 is a schematic diagram illustrating an off-line personalized voice conversion system according to the second embodiment of the present invention. Referring to FIG. 6, the intelligent device 21 includes a voice clarifying device. When the intelligent device 21 stops communicating with the first cloud server 20_1 and the second cloud server 20_2, the voice clarifying device of the intelligent device 21 receives the second original voice signal V2, converts the second original voice signal V2 into the second intelligible voice signal V2' based on the off-line voice conversion model M and the computational cache technology, and plays the second intelligible voice signal V2'.

As illustrated in FIG. 5 and FIG. 6, the first cloud server 20_1 may include a data transmission interface 20_11, a database 20_12, and a voice clarifying device 20_13 in some embodiments of the present invention. The second cloud server 20_2 may include a data transmission interface 20_21 and a voice training device 20_22. The data transmission interfaces 20_11 and 20_21 communicate with the intelligent device 21. The database 20_12 is electrically connected to the data transmission interface 20_11. The voice clarifying device 20_13 is electrically connected to the data transmission interface 20_11. The voice training device 20_22 is electrically connected to the database 20_12, the data transmission interface 20_21, and the voice clarifying device 20_13. When the data transmission interfaces 20_11 and 20_21 communicate with the intelligent device 21, the database 20_12 receives and stores the first original voice signal V1 through the data transmission interface 20_11. The voice clarifying device 20_13 receives the first original voice signal V1 through the data transmission interface 20_11 and converts the first original voice signal V1 into the first intelligible voice signal V1' based on the intelligible voice conversion model. The intelligent device 21 downloads the first intelligible voice signal V1' through the data transmission interface 20_11. The voice training device 20_22 respectively receives the first original voice signal V1 and the corresponding first intelligible voice signal V1' from the database 20_12 and the voice clarifying device 20_13. The voice training device 20_22 trains the off-line voice conversion model M based on the first original voice signal V1 and the corresponding first intelligible voice signal V1'. The intelligent device 21 downloads the off-line voice conversion model M through the data transmission interface 20_21. The voice clarifying device 20+13 may be the same as the voice clarifying device of the intelligent device 21, but the present invention is not limited to the implementation of the voice clarifying device.

Figure 7:
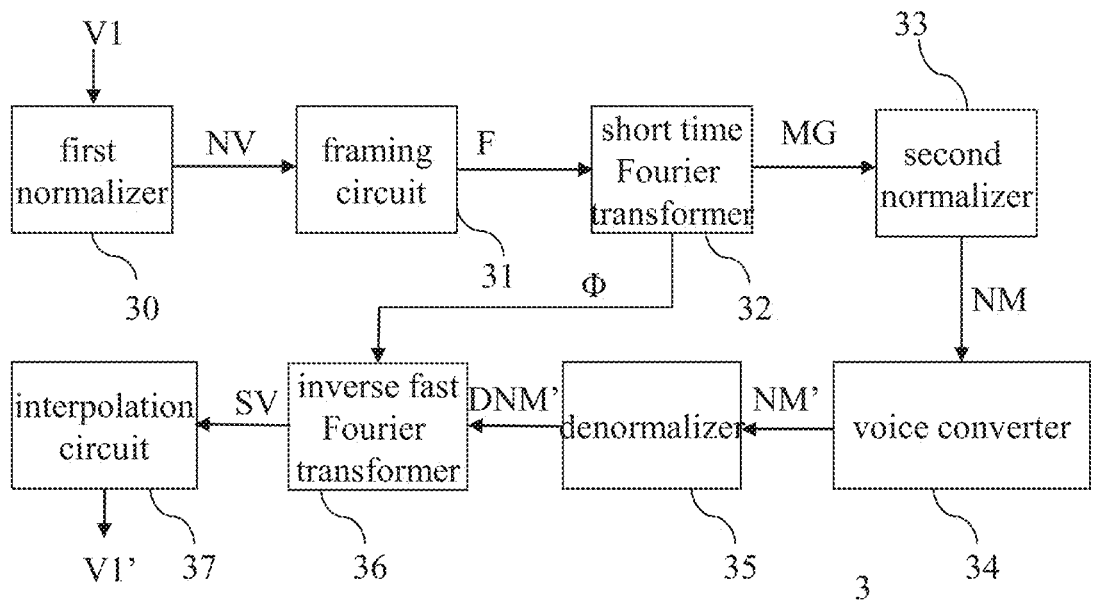
FIG. 7 is a schematic diagram illustrating a voice clarifying device according to an embodiment of the present invention.

The present invention is not limited to the implementation of the voice clarifying devices 202 or 20_13. FIG. 7 is a schematic diagram illustrating a voice clarifying device according to an embodiment of the present invention. Referring to FIG. 3, FIG. 5, and FIG. 7, a voice clarifying device 3 may be applied to the first embodiment or the second embodiment. The voice clarifying device 3 may include a first normalizer 30, a framing circuit 31, a short time Fourier transformer 32, a second normalizer 33, a voice converter 34, a denormalizer 35, an inverse fast Fourier transformer 36, and an interpolation circuit 37. The first normalizer 30 is electrically connected to the data transmission interface 200 or 20_11. The framing circuit 31 is electrically connected to the first normalizer 30. The short time Fourier transformer 32 is electrically connected to the framing circuit 31. The second normalizer 33 is electrically connected to the short time Fourier transformer 32. The voice converter 34 is electrically connected to the second normalizer 33. The denormalizer 35 is electrically connected to the voice converter 34. The inverse fast Fourier transformer 36 is electrically connected to the short time Fourier transformer 32 and the denormalizer 35. The interpolation circuit 37 is electrically connected to the voice training device 203, the inverse fast Fourier transformer 36, and the data transmission interface 200. Alternatively, the interpolation circuit 37 is electrically connected to the voice training device 20_22, the inverse fast Fourier transformer 36, and the data transmission interface 20_21. The first normalizer 30 receives and normalizes the first original voice signal V1 to generate a normalized voice signal NV. The framing circuit 31 receives and divides the normalized voice signal NV into overlapping frames F. The short time Fourier transformer 32 retrieves frequency-domain information from each of the frames F, wherein the frequency-domain information includes voice magnitude MG and voice phases Φ. The second normalizer 33 receives and normalizes the voice magnitude MG to generate normalized voice magnitude NM. The voice converter 34 receives the normalized voice magnitude NM and converts the normalized voice magnitude NM into intelligible voice magnitude NM' based on the intelligible voice conversion model. The denormalizer 35 denormalizes the intelligible voice magnitude NM' to generate denormalized intelligible voice magnitude DNM'. The inverse fast Fourier transformer 36 receives and synthesizes the voice phases Φ and the denormalized intelligible voice magnitude DNM' to generate a synthesized voice signal SV in time domain. The interpolation circuit 37 receives the synthesized voice signal SV and perform interpolation on the synthesized voice signal SV to generate the first intelligible voice signal V1'.

Figure 8:
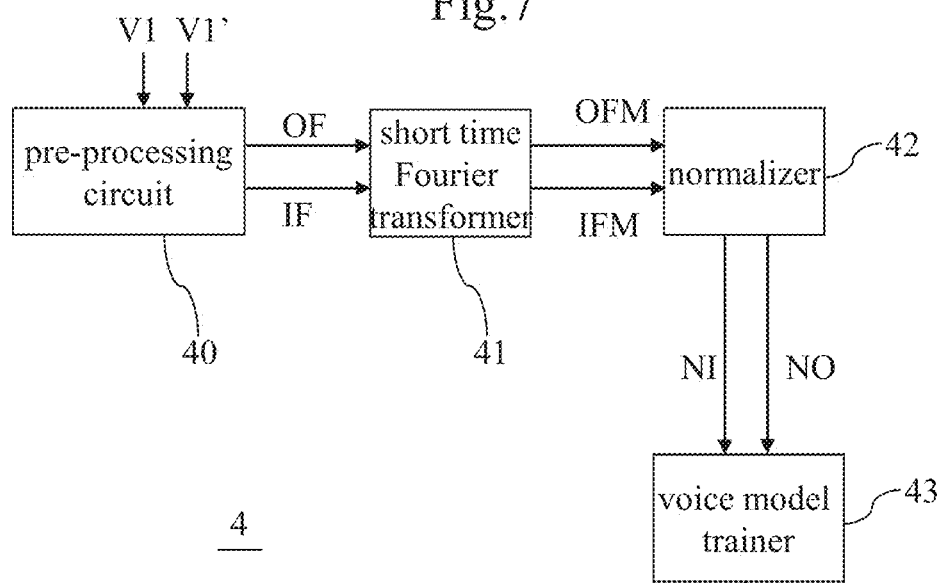
FIG. 8 is a schematic diagram illustrating a voice training device according to an embodiment of the present invention.

The present invention is not limited to the implementation of the voice training devices 203 or 20_22. FIG. 8 is a schematic diagram illustrating a voice training device according to an embodiment of the present invention. Referring to FIG. 3, FIG. 5, and FIG. 8, the voice training device 4 may be applied to the first embodiment or the second embodiment. The voice training device 4 may include a pre-processing circuit 40, a short time Fourier transformer 41, a normalizer 42, and a voice model trainer 43. The pre-processing circuit 40 is electrically connected to the database 201 and the voice clarifying device 202. Alternatively, the pre-processing circuit 40 is electrically connected to the database 20_12 and the voice clarifying device 20_13. The short time Fourier transformer 41 is electrically connected to the pre-processing circuit 40. The normalizer 42 is electrically connected to the short time Fourier transformer 41. The voice model trainer 43 is electrically connected to the normalizer 42 and the data transmission interface 20_21. The pre-processing circuit 40 receives the first original voice signal V1 and the corresponding first intelligible voice signal V1', uses dynamic time warping (DTW) to align the first original voice signal V1 to the corresponding first intelligible voice signal V1', and frames the first original voice signal V1 and the corresponding first intelligible voice signal V1' to generate original frames OF and intelligible frames IF. The short time Fourier transformer 41 receives the original frames OF and the intelligible frames IF and respectively retrieves original voice features OFM and intelligible voice features IFM from the original frames OF and the intelligible frames IF. The normalizer 42 receives and normalizes the original voice features OFM and the intelligible voice features IFM to respectively generate normalized original voice features NO and normalized intelligible voice features NI. The voice model trainer 43 receives the normalized original voice features NO and the normalized intelligible voice features NI and trains the off-line voice conversion model based on the normalized original voice features NO and the normalized intelligible voice features NI.

Figure 9:
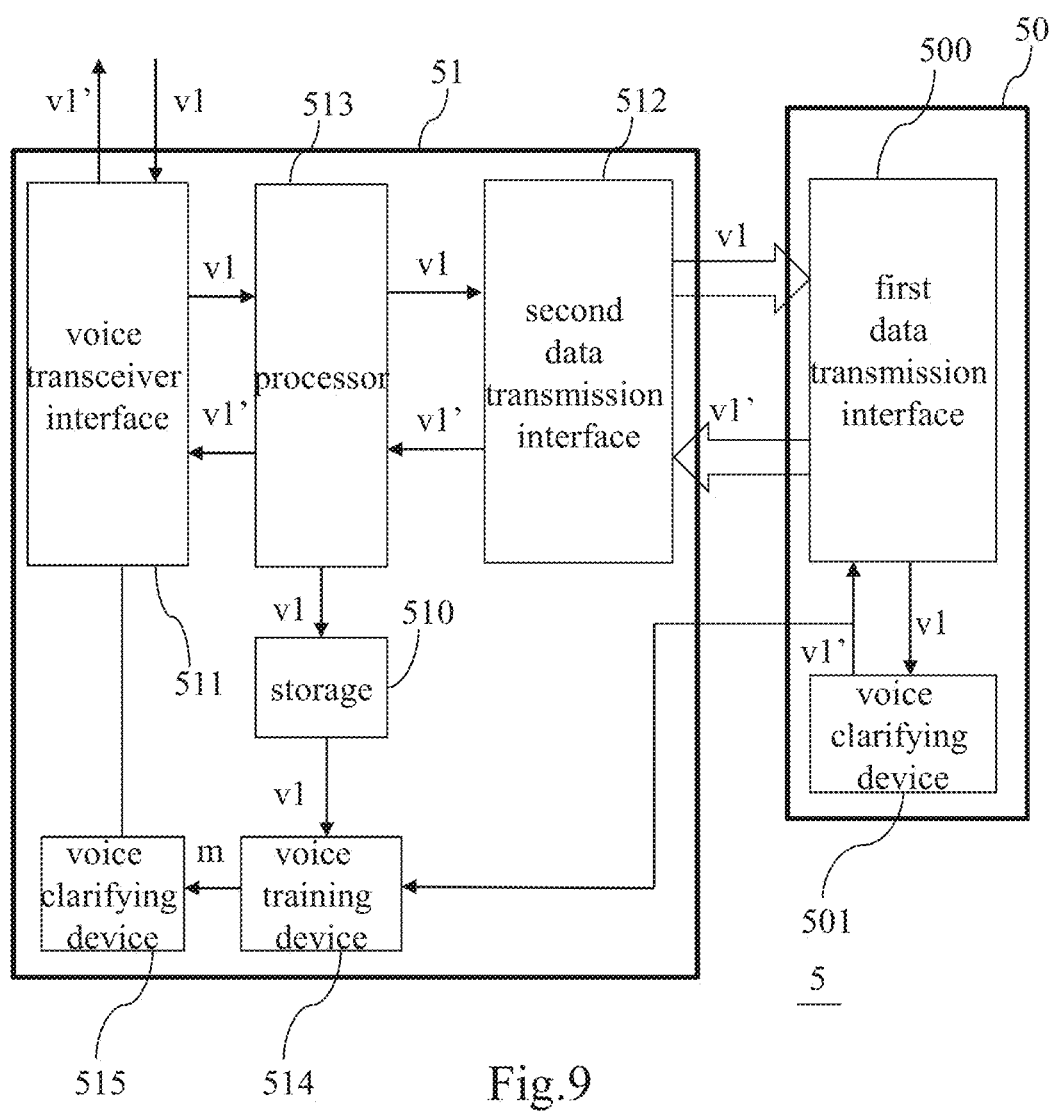
FIG. 9 is a schematic diagram illustrating an on-line personalized voice conversion system according to a third embodiment of the present invention.

FIG. 9 is a schematic diagram illustrating an on-line personalized voice conversion system according to a third embodiment of the present invention. Referring to FIG. 9, the third embodiment of the personalized voice conversion system of the present invention is introduced as follows. The personalized voice conversion system 5 includes at least one cloud server 50 and an intelligent device 51. The cloud server 50 communicates with the intelligent device 51. For clarity and convenience, the third embodiment exemplifies one cloud server 50. The intelligent device 51 may be an intelligent phone or a tablet computer, but the present invention is not limited thereto.

When the intelligent device 51 communicates with the cloud server 50, the intelligent device 51 receives and stores at least one first original signal v1 and upstream the first original signal v1 to the cloud server 50. The cloud server 50 converts the first original signal v1 into at least one first intelligible voice signal v1' based on trained-well artificial intelligence model, such as an intelligible voice conversion model. The intelligent device 51 downloads and plays the first intelligible voice signal v1'. The intelligent device 51 trains at least one off-line voice conversion model m based on the first original signal v1 and the corresponding first intelligible voice signal v1'. The intelligible voice conversion model and the off-line voice conversion model m are implemented with a deep neural networks (DNNs) or generative adversarial networks (GANs), but the present invention is not limited thereto.

Figure 10:
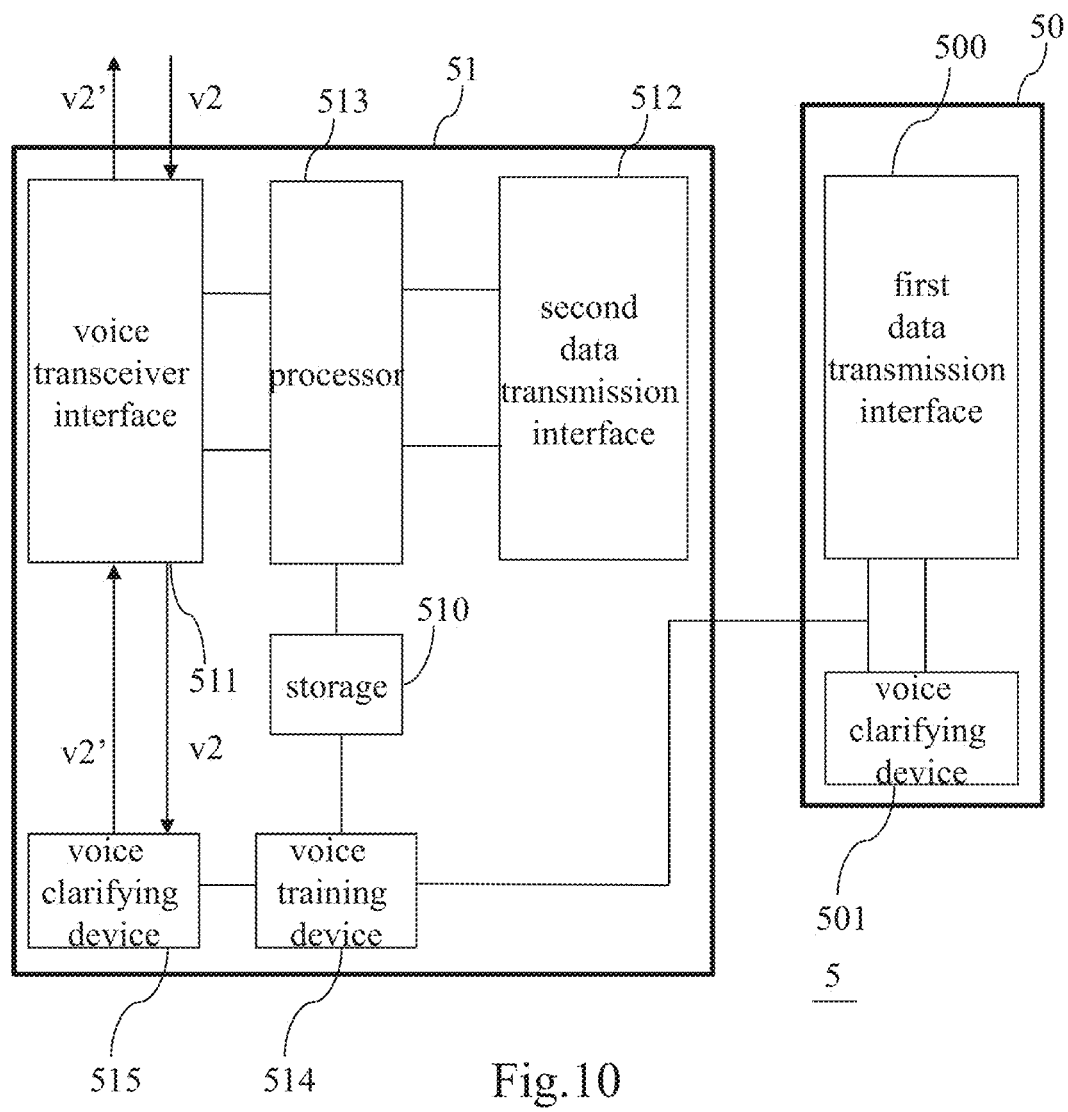
FIG. 10 is a schematic diagram illustrating an off-line personalized voice conversion system according to the third embodiment of the present invention.

FIG. 10 is a schematic diagram illustrating an off-line personalized voice conversion system according to the third embodiment of the present invention. Referring to FIG. 10, when the intelligent device 51 stops communicating with the cloud server 50, the intelligent device 51 receives a second original voice signal v2, converts the second original voice signal v2 into a second intelligible voice signal v2' based on the computational cache technology and the off-line voice conversion model, and plays the second intelligible voice signal v2'.

As illustrated in FIG. 9 and FIG. 10, there are a plurality of first original voice signals v1, a plurality of first intelligible voice signals v1', and a plurality of off-line voice conversion models m in some embodiments of the present invention. The intelligent device 51 sequentially trains the plurality of off-line voice conversion models m and regularly or irregularly use the latest off-line voice conversion model m of the plurality of off-line voice conversion models m to update the remains of the plurality of off-line voice conversion models m. When the intelligent device 51 stops communicating with the cloud server 50, the intelligent device 51 converts the second original voice signal v2 into the second intelligible voice signal v2' based on the latest off-line voice conversion model m of the plurality of off-line voice conversion models m. Thus, when the times of using the computational cache technology are more, the voice conversion effect, such as the conversion effect of timbre and pitch, is better without adding additional storage space and computation.

As illustrated in FIG. 9 and FIG. 10, the cloud server 50 may include a first data transmission interface 500 and a voice clarifying device 501. The first data transmission interface 500 communicates with the intelligent device 51. The voice clarifying device 501 is electrically connected to the first data transmission interface 500. The voice clarifying device 501 receives the first original voice signal v1 through the first data transmission interface 500 and converts the first original voice signal v1 into the first intelligible voice signal v1' based on the intelligible voice conversion model.

The intelligent device 51 may include a storage 510, a voice transceiver interface 511, a second data transmission interface 512, a processor 513, a voice training device 514, and a voice clarifying device 515. The second data transmission interface 512 communicates with the first data transmission interface 500. The processor 510 is electrically connected to the storage 510, the voice transceiver interface 511, and the second data transmission interface 512. The voice training device 514 is electrically connected to the storage 510 and the voice clarifying device 501. The voice clarifying device 515 is electrically connected to the voice transceiver interface 511 and the voice training device 514. The voice transceiver interface 511 receives the first original voice signal v1. The processor 513 receives the first original voice signal v1 through the voice transceiver interface 511, outputs the first original voice signal v1 through the second data transmission interface 512, and stores the first original voice signal v1 in the storage 510. The voice training device 514 receives the first original voice signal v1 and the corresponding first intelligible voice signal v1' and train the off-line voice conversion model m based on the first original voice signal v1 and the corresponding first intelligible voice signal v1'. The voice clarifying device 515 receives the second original voice signal v2 through the voice transceiver interface 511. The voice clarifying device 515 converts the second original voice signal v2 into the second intelligible voice signal v2' based on the off-line voice conversion model m. The voice clarifying device 515 and the voice transceiver interface 511 play the second intelligible voice signal v2'. The voice clarifying device 501 is the same as the voice clarifying device 515, but the present invention is not limited to the implementation of the voice clarifying device.

Figure 11:
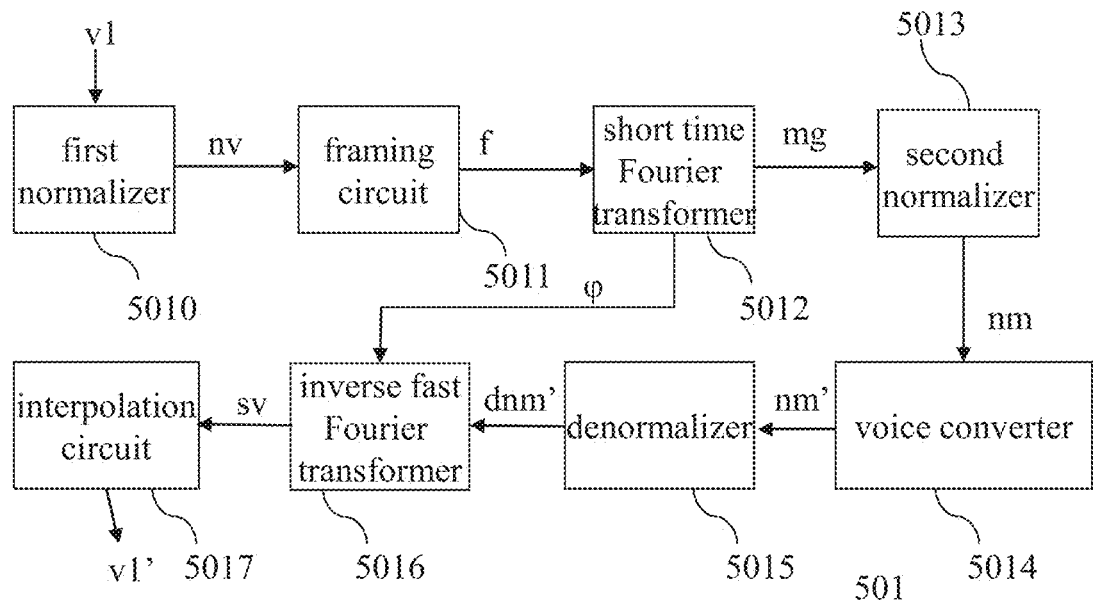
FIG. 11 is a schematic diagram illustrating a voice clarifying device according to another embodiment of the present invention.

The present invention is not limited to the implementation of the voice clarifying device 501. FIG. 11 is a schematic diagram illustrating a voice clarifying device according to another embodiment of the present invention. The voice clarifying device 501 may include a first normalizer 5010, a framing circuit 5011, a short time Fourier transformer 5012, a second normalizer 5013, a voice converter 5014, a denormalizer 5015, an inverse fast Fourier transformer 5016, and an interpolation circuit 5017. The first normalizer 5010 is electrically connected to the first data transmission interface 500. The framing circuit 5011 is electrically connected to the first normalizer 5010. The short time Fourier transformer 5012 is electrically connected to the framing circuit 5011. The second normalizer 5013 is electrically connected to the short time Fourier transformer 5012. The voice converter 5014 is electrically connected to the second normalizer 5013. The denormalizer 5015 is electrically connected to the voice converter 5014. The inverse fast Fourier transformer 5016 is electrically connected to the short time Fourier transformer 5012 and the denormalizer 5015. The interpolation circuit 5017 is electrically connected to the voice training device 514, the inverse fast Fourier transformer 5016, and the first data transmission interface 500. The first normalizer 5010 receives and normalizes the first original voice signal v1 to generate a normalized voice signal nv. The framing circuit 5011 receives and divides the normalized voice signal nv into overlapping frames f. The short time Fourier transformer 5012 retrieves frequency-domain information from each of the frames f, wherein the frequency-domain information includes voice magnitude mg and voice phases φ. The second normalizer 5013 receives and normalizes the voice magnitude mg to generate normalized voice magnitude nm. The voice converter 5014 receives the normalized voice magnitude nm and converts the normalized voice magnitude nm into intelligible voice magnitude nm' based on the intelligible voice conversion model. The denormalizer 5015 denormalizes the intelligible voice magnitude nm' to generate denormalized intelligible voice magnitude dnm'. The inverse fast Fourier transformer 5016 receives and synthesizes the voice phases φ and the denormalized intelligible voice magnitude dnm' to generate a synthesized voice signal sv in time domain. The interpolation circuit 5017 receives the synthesized voice signal sv and perform interpolation on the synthesized voice signal sv to generate the first intelligible voice signal v1'.

Figure 12:
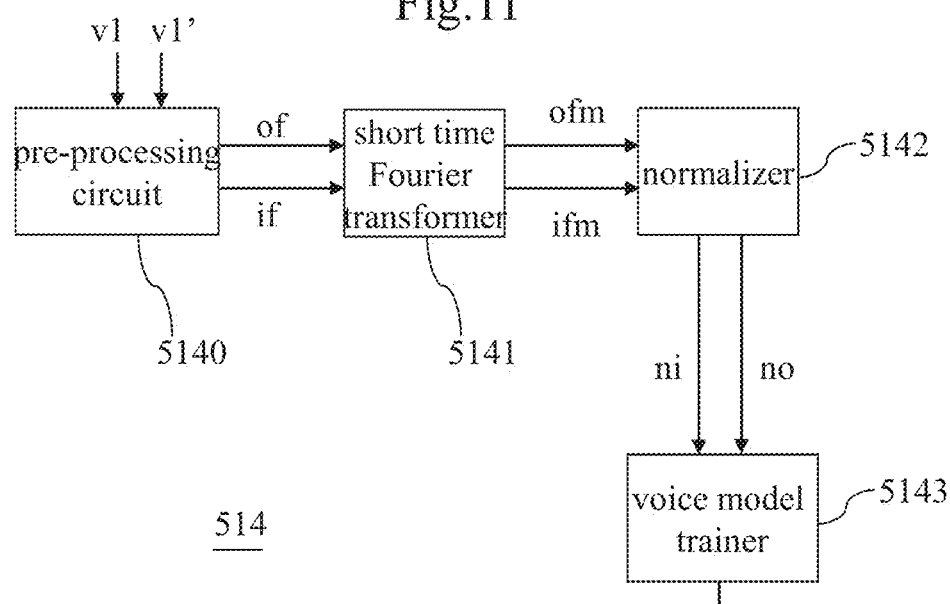
FIG. 12 is a schematic diagram illustrating a voice training device according to another embodiment of the present invention.

The present invention is not limited to the implementation of the voice training device 514. FIG. 12 is a schematic diagram illustrating a voice training device according to another embodiment of the present invention. Referring to FIG. 9, FIG. 11, and FIG. 12, the voice training device 514 may include a pre-processing circuit 5140, a short time Fourier transformer 5141, a normalizer 5142, and a voice model trainer 5143. The pre-processing circuit 5140 is electrically connected to the storage 510 and the interpolation circuit 5017. The short time Fourier transformer 5141 is electrically connected to the pre-processing circuit 5140. The normalizer 5142 is electrically connected to the short time Fourier transformer 5141. The voice model trainer 5143 is electrically connected to the normalizer 5142 and the voice clarifying device 515. The pre-processing circuit 5140 receives the first original voice signal v1 and the corresponding first intelligible voice signal v1', uses dynamic time warping (DTW) to align the first original voice signal v1 to the corresponding first intelligible voice signal v1', and frames the first original voice signal v1 and the corresponding first intelligible voice signal v1' to generate original frames of and intelligible frames if. The short time Fourier transformer 5141 receives the original frames of and the intelligible frames if. The short time Fourier transformer 5141 respectively retrieves original voice features ofm and intelligible voice features ifm from the original frames of and the intelligible frames if. The normalizer 5142 receives and normalizes the original voice features ofm and the intelligible voice features ifm to respectively generate normalized original voice features no and normalized intelligible voice features ni. The voice model trainer 5143 receives the normalized original voice features no and the normalized intelligible voice features ni and trains the off-line voice conversion model m based on the normalized original voice features no and the normalized intelligible voice features ni.

The second original voice signal is converted without using automatic speech recognition (ASR) and text-to-speech conversion. In other words, the personalized voice conversion system does not convert voices into texts and convert texts into voices. In addition, the personalized voice conversion system does not use any off-line database. The personalized voice conversion system can process difficultly recognized voices, such as dysarthria voices difficultly recognized with ASR, and have wider application. The neural network model based on ASR and TTS is more complex. It is difficult to use the low-complexity fully connected deep neural network (FC-DNN) to achieve better voice conversion effect. The neural network model based on ASR and TTS is not suitable for application on edge devices. Based on the human ear's sensitivity to human voices, the converted voices can be clearly recognized with the spectral mapping of the low-complexity GAN.

The personalized voice conversion system can be applied to patients with amyotrophic lateral sclerosis to convert their voices into intelligible voices. The intelligent device is implemented with an intelligent phone, and the off-line voice conversion model is implemented with a fully connected deep neural network. The voice conversion service for patients with amyotrophic lateral sclerosis provided by Google Project Euphonia installed in the cloud server trains voices and converts voices. In the past, fully connected deep neural networks have been able to successfully convert dysarthria voices into high-recognition voices. Firstly, determine whether the intelligent phone is in an on-line environment. If the intelligent phone is in an on-line environment, the voices of the patients with amyotrophic lateral sclerosis are upstreamed to the cloud server and converted with Google Project Euphonia. Then, the converted voices are downstreamed to the intelligent phone for playback. Simultaneously, the cloud server uses the stored voice to train the off-line voice conversion model. After training the off-line voice conversion model, the off-line voice conversion model is downloaded when the intelligent phone is in an on-line environment and in a standby state. When the intelligent phone is in an off-line environment, the intelligent phone can still convert the voices of patients with amyotrophic lateral sclerosis into intelligible voices with the fully connected deep neural network.

According to the embodiments provided above, the personalized voice conversion system obtains the corresponding data results based on the computational cache technology and the off-line voice conversion model. When the times of using the computational cache technology are more, the voice conversion effect is better without adding additional storage space and computation.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A personalized voice conversion system comprising:
at least one cloud server; and
an intelligent device communicating with the at least one cloud server, wherein the intelligent device is configured to receive at least one first original voice signal and upstream the at least one first original voice signal to the at least one cloud server, the at least one cloud server is configured to store the at least one first original voice signal and convert the at least one first original voice signal into at least one first intelligible voice signal based on an intelligible voice conversion model, the intelligent device is configured to download and play the at least one first intelligible voice signal, the at least one cloud server is configured to train at least one off-line voice conversion model based on the at least one first original voice signal and a corresponding the at least one first intelligible voice signal, the intelligent device is configured to download the at least one off-line voice conversion model, and when the intelligent device stops communicating with the at least one cloud server, the intelligent device receives a second original voice signal, converts the second original voice signal into a second intelligible voice signal based on the at least one off-line voice conversion model, and plays the second intelligible voice signal.

2. The personalized voice conversion system according to claim 1, wherein the at least one cloud server includes a first cloud server and a second cloud server, the first cloud server is electrically connected to the second cloud server, when the first cloud server and the second cloud server communicate with the intelligent device, the intelligent device upstreams the at least one first original voice signal to the first cloud server and stores the at least one first original voice signal into the first cloud server, the first cloud server converts the at least one first original voice signal into the at least one first intelligible voice signal based on the intelligible voice conversion model and transmits the at least one first original voice signal and the at least one first intelligible voice signal to the second cloud server, the second cloud server trains the at least one off-line voice conversion model based on the at least one first original voice signal and a corresponding the at least one first intelligible voice signal, and when the intelligent device stops communicating with the first cloud server and the second cloud server, the intelligent device receives the second original voice signal.

3. The personalized voice conversion system according to claim 1, wherein the at least one first original voice signal includes a plurality of first original voice signals, the at least one first intelligible voice signal includes a plurality of first intelligible voice signals, the at least one off-line voice conversion model includes a plurality of off-line voice conversion models, the intelligent device is configured to sequentially download the plurality of off-line voice conversion models and use a latest off-line voice conversion model of the plurality of off-line voice conversion models to update remains of the plurality of off-line voice conversion models, and when the intelligent device stops communicating with the at least one cloud server, the intelligent device converts the second original voice signal into the second intelligible voice signal based on the latest off-line voice conversion model of the plurality of off-line voice conversion models.

4. The personalized voice conversion system according to claim 1, wherein the at least one cloud server includes:
- a data transmission interface communicating with the intelligent device, wherein the intelligent device is configured to download the at least one first intelligible voice signal and the at least one off-line voice conversion model through the data transmission interface;
- a database electrically connected to the data transmission interface and configured to receive and store the at least one first original voice signal through the data transmission interface;
- a voice clarifying device electrically connected to the data transmission interface and configured to receive the at least one first original voice signal through the data transmission interface and convert the at least one first original voice signal into the at least one first intelligible voice signal based on the intelligible voice conversion model; and
- a voice training device electrically connected to the database, the data transmission interface, and the voice clarifying device, wherein the voice training device is configured to receive the at least one first original voice signal and a corresponding the at least one first intelligible voice signal and train the at least one off-line voice conversion model based on the at least one first original voice signal and a corresponding the at least one first intelligible voice signal.

5. The personalized voice conversion system according to claim 4, wherein the voice clarifying device includes:
- a first normalizer electrically connected to the data transmission interface, wherein the first normalizer is configured to receive and normalize the at least one first original voice signal to generate a normalized voice signal;
- a framing circuit electrically connected to the first normalizer and configured to receive and divide the normalized voice signal into overlapping frames;
- a short time Fourier transformer electrically connected to the framing circuit and configured to retrieve frequency-domain information from each of the overlapping frames, wherein the frequency-domain information includes voice magnitude and voice phases;
- a second normalizer electrically connected to the short time Fourier transformer and configured to receive and normalize the voice magnitude to generate normalized voice magnitude;
- a voice converter electrically connected to the second normalizer and configured to receive the normalized voice magnitude, wherein the voice converter is configured to convert the normalized voice magnitude into intelligible voice magnitude based on the intelligible voice conversion model;
- a denormalizer electrically connected to the voice converter and configured to denormalize the intelligible voice magnitude to generate denormalized intelligible voice magnitude;
- an inverse fast Fourier transformer electrically connected to the short time Fourier transformer and the denormalizer, wherein the inverse fast Fourier transformer is configured to receive and synthesize the voice phases and the denormalized intelligible voice magnitude to generate a synthesized voice signal in time domain; and
- an interpolation circuit electrically connected to the voice training device, the inverse fast Fourier transformer, and the data transmission interface and configured to receive the synthesized voice signal and perform interpolation on the synthesized voice signal to generate the at least one first intelligible voice signal.

6. The personalized voice conversion system according to claim 4, wherein the voice training device includes:
- a pre-processing circuit electrically connected to the database and the voice clarifying device, wherein the pre-processing circuit is configured to receive the at least one first original voice signal and a corresponding the at least one first intelligible voice signal, use dynamic time warping (DTW) to align the at least one first original voice signal to a corresponding the at least one first intelligible voice signal, and frame the at least one first original voice signal and a corresponding the at least one first intelligible voice signal to generate original frames and intelligible frames;
- a short time Fourier transformer electrically connected to the pre-processing circuit and configured to receive the original frames and the intelligible frames, wherein the short time Fourier transformer is configured to respectively retrieve original voice features and intelligible voice features from the original frames and the intelligible frames;
- a normalizer electrically connected to the short time Fourier transformer and configured to receive and normalize the original voice features and the intelligible voice features to respectively generate normalized original voice features and normalized intelligible voice features; and
- a voice model trainer electrically connected to the normalizer and the data transmission interface and configured to receive the normalized original voice features and the normalized intelligible voice features and train the at least one off-line voice conversion model based on the normalized original voice features and the normalized intelligible voice features.

7. The personalized voice conversion system according to claim 1, wherein the intelligent device is an intelligent phone or a tablet computer.

8. The personalized voice conversion system according to claim 1, wherein the intelligible voice conversion model and the at least one off-line voice conversion model are implemented with deep neural networks (DNNs) or generative adversarial networks (GANs).

9. A personalized voice conversion system comprising:
- at least one cloud server; and
- an intelligent device communicating the at least one cloud server, wherein the intelligent device is configured to receive and store at least one first original voice signal and upstream the at least one first original voice signal to the at least one cloud server, the at least one cloud server is configured to convert the at least one first original signal into at least one first intelligible voice signal based on an intelligible voice conversion model, the intelligent device is configured to download and play the at least one first intelligible voice signal, the intelligent device is configured to train at least one off-line voice conversion model based on the at least one first original signal and a corresponding the at least one first intelligible voice signal, and when the intelligent device stops communicating with the at least one cloud server, the intelligent device receives a second original voice signal, converts the second original voice signal into a second intelligible voice signal based on the at least one off-line voice conversion model, and plays the second intelligible voice signal.

10. The personalized voice conversion system according to claim 9, wherein the at least one first original voice signal includes a plurality of first original voice signals, the at least one first intelligible voice signal includes a plurality of first intelligible voice signals, the at least one off-line voice conversion model includes a plurality of off-line voice conversion models, the intelligent device is configured to sequentially train the plurality of off-line voice conversion models and use a latest off-line voice conversion model of the plurality of off-line voice conversion models to update remains of the plurality of off-line voice conversion models, and when the intelligent device stops communicating with the at least one cloud server, the intelligent device converts the second original voice signal into the second intelligible voice signal based on the latest off-line voice conversion model of the plurality of off-line voice conversion models.

11. The personalized voice conversion system according to claim 9, wherein the at least one cloud server includes:
   a first data transmission interface communicating with the intelligent device; and
   a voice clarifying device electrically connected to the first data transmission interface and configured to receive the at least one first original voice signal through the first data transmission interface and convert the at least one first original voice signal into the at least one first intelligible voice signal based on the intelligible voice conversion model.

12. The personalized voice conversion system according to claim 11, wherein the voice clarifying device includes:
   a first normalizer electrically connected to the first data transmission interface, wherein the first normalizer is configured to receive and normalize the at least one first original voice signal to generate a normalized voice signal;
   a framing circuit electrically connected to the first normalizer and configured to receive and divide the normalized voice signal into overlapping frames;
   a short time Fourier transformer electrically connected to the framing circuit and configured to retrieve frequency-domain information from each of the overlapping frames, wherein the frequency-domain information includes voice magnitude and voice phases;
   a second normalizer electrically connected to the short time Fourier transformer and configured to receive and normalize the voice magnitude to generate normalized voice magnitude;
   a voice converter electrically connected to the second normalizer and configured to receive the normalized voice magnitude, wherein the voice converter is configured to convert the normalized voice magnitude into intelligible voice magnitude based on the intelligible voice conversion model;
   a denormalizer electrically connected to the voice converter and configured to denormalize the intelligible voice magnitude to generate denormalized intelligible voice magnitude;
   an inverse fast Fourier transformer electrically connected to the short time Fourier transformer and the denormalizer, wherein the inverse fast Fourier transformer is configured to receive and synthesize the voice phases and the denormalized intelligible voice magnitude to generate a synthesized voice signal in time domain; and
   an interpolation circuit electrically connected to the inverse fast Fourier transformer and the first data transmission interface and configured to receive the synthesized voice signal and perform interpolation on the synthesized voice signal to generate the at least one first intelligible voice signal.

13. The personalized voice conversion system according to claim 12, wherein the intelligent device includes:
   a storage;
   a voice transceiver interface configured to receive the at least one first original voice signal;
   a second data transmission interface communicating with the first data transmission interface;
   a processor electrically connected to the storage, the voice transceiver interface, and the second data transmission interface and configured to receive the at least one first original voice signal through the voice transceiver interface, wherein the processor is configured to output the at least one first original voice signal through the second data transmission interface and store the at least one first original voice signal in the storage;
   a voice training device electrically connected to the storage and the interpolation circuit, wherein the voice training device is configured to receive the at least one first original voice signal and a corresponding the at least one first intelligible voice signal and train the at least one off-line voice conversion model based on the at least one first original voice signal and a corresponding the at least one first intelligible voice signal; and
   a voice clarifying device electrically connected to the voice transceiver interface and the voice training device and configured to receive the second original voice signal through the voice transceiver interface, wherein the voice clarifying device is configured to convert the second original voice signal into the second intelligible voice signal based on the at least one off-line voice conversion model, and the voice clarifying device and the voice transceiver interface are configured to play the second intelligible voice signal.

14. The personalized voice conversion system according to claim 13, wherein the voice training device includes:
   a pre-processing circuit electrically connected to the storage and the interpolation circuit, wherein the pre-processing circuit is configured to receive the at least one first original voice signal and a corresponding the at least one first intelligible voice signal, use dynamic time warping (DTW) to align the at least one first original voice signal to a corresponding the at least one first intelligible voice signal, and frame the at least one first original voice signal and a corresponding the at least one first intelligible voice signal to generate original frames and intelligible frames;
   a short time Fourier transformer electrically connected to the pre-processing circuit and configured to receive the original frames and the intelligible frames, wherein the short time Fourier transformer is configured to respectively retrieve original voice features and intelligible voice features from the original frames and the intelligible frames;
   a normalizer electrically connected to the short time Fourier transformer and configured to receive and normalize the original voice features and the intelligible voice features to respectively generate normalized original voice features and normalized intelligible voice features; and
   a voice model trainer electrically connected to the normalizer and the voice clarifying device and configured to receive the normalized original voice features and the normalized intelligible voice features and train the at least one off-line voice conversion model based on the normalized original voice features and the normalized intelligible voice features.

15. The personalized voice conversion system according to claim 9, wherein the intelligent device is an intelligent phone or a tablet computer.

16. The personalized voice conversion system according to claim 9, wherein the intelligible voice conversion model and the at least one off-line voice conversion model are implemented with a deep neural networks (DNNs) or generative adversarial networks (GANs).

* * * * *